(12) United States Patent
Ryou et al.

(10) Patent No.: US 10,594,009 B2
(45) Date of Patent: Mar. 17, 2020

(54) ZINC-AIR BATTERY

(71) Applicant: E.M.W. ENERGY CO., LTD., Seoul (KR)

(72) Inventors: Byoung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 0 days.

(21) Appl. No.: 15/772,578

(22) PCT Filed: Oct. 25, 2016

(86) PCT No.: PCT/KR2016/012016
§ 371 (c)(1),
(2) Date: May 1, 2018

(87) PCT Pub. No.: WO2017/082555
PCT Pub. Date: May 18, 2017

(65) Prior Publication Data
US 2019/0097290 A1    Mar. 28, 2019

(30) Foreign Application Priority Data

Nov. 11, 2015  (KR) .......................... 10-2015-0158393

(51) Int. Cl.
| | |
|---|---|
| *H01M 12/06* | (2006.01) |
| *H01M 4/24* | (2006.01) |
| *H01M 6/34* | (2006.01) |
| *H01M 4/86* | (2006.01) |
| *H01M 4/90* | (2006.01) |

(52) U.S. Cl.
CPC .......... *H01M 12/06* (2013.01); *H01M 4/244* (2013.01); *H01M 4/8652* (2013.01); *H01M 4/8657* (2013.01); *H01M 4/9016* (2013.01); *H01M 4/9041* (2013.01); *H01M 6/34* (2013.01)

(58) Field of Classification Search
CPC .......... H01M 12/06; H01M 6/34; H01M 6/30; H01M 6/32
USPC .................................................. 429/118–119
See application file for complete search history.

(56) References Cited

U.S. PATENT DOCUMENTS

| | | | | |
|---|---|---|---|---|
| 2,497,852 | A * | 2/1950 | Arenstein ................. | B63C 9/21 244/138 R |
| 3,592,693 | A * | 7/1971 | Rosansky ............... | H01M 4/02 429/118 |
| 4,184,009 | A * | 1/1980 | Armstrong .......... | H01M 2/1613 429/119 |

(Continued)

FOREIGN PATENT DOCUMENTS

| | | |
|---|---|---|
| GB | 999193 A | 7/1965 |
| JP | H8-31425 A | 2/1996 |

(Continued)

OTHER PUBLICATIONS

International Search Report for PCT/KR2016/012016.

*Primary Examiner* — Maria Laios
(74) *Attorney, Agent, or Firm* — The PL Law Group, PLLC

(57) ABSTRACT

A zinc-air battery includes an air electrode part, a separator and a negative electrode part in sequence within a case, wherein the negative electrode part comprises potassium hydroxide (KOH) in the form of powder, and the case has an opening part formed in at least one region thereof, with the opening part being covered by a porous membrane.

5 Claims, 1 Drawing Sheet

(56) References Cited

U.S. PATENT DOCUMENTS

| | | | |
|---|---|---|---|
| 5,362,577 A | 11/1994 | Pedicini | |
| 2006/0147775 A1 | 7/2006 | Fiedler | |

FOREIGN PATENT DOCUMENTS

| | | | |
|---|---|---|---|
| JP | 2000-82503 A | 3/2000 | |
| JP | 2012-99266 A | 5/2012 | |
| JP | 2015-103430 A | 6/2015 | |
| KR | 10-2007-0101329 A | 10/2007 | |
| KR | 10-2007-0102144 A | 10/2007 | |
| KR | 10-2011-0105051 A | 9/2011 | |
| KR | 10-2015-0089150 A | 8/2015 | |
| KR | 10-1934525 B1 | 3/2019 | |
| WO | WO 03/058736 A1 | 7/2003 | |

\* cited by examiner

ZINC-AIR BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/012016, filed Oct. 25, 2016, which claims priority to the benefit of Korean Patent Application No. 10-2015-0158393 filed in the Korean Intellectual Property Office on Nov. 11, 2015, the entire contents of which are incorporated herein by reference.

TECHNICAL FIELD

The present invention relates to a zinc-air battery having an excellent storage property in an ordinary situation and capable of effectively generating electricity when being exposed to a water environment.

BACKGROUND ART

A battery has been conventionally and widely used as a means for supplying electric power to an electrical device. Conventionally, primary batteries such as a manganese dry cell, an alkaline manganese dry cell, a zinc-air battery, and the like, and secondary batteries such as a nickel-cadmium (Ni—Cd) battery, a nickel-hydrogen (Ni—H) battery, a lithium ion battery, and the like are used as batteries. Among the foregoing batteries, the zinc-air battery has advantages of providing a relatively high voltage of 1.4 V and having high energy density and large discharge capacity. Further, the zinc-air battery exhibits an almost constant discharge characteristic until electrical discharge of the zinc-air battery is completed, and the zinc-air battery is considered as a battery capable of replacing a mercury battery of which usage is suppressed owing to containing a heavy metal.

Resulting from the foregoing advantages, the zinc-air battery has been applied to various fields such as military weapons and industrial equipment, and the inventors of the present invention have sought for a strategy to apply the zinc-air battery to a device or equipment, such as marine rescue equipment, exposed to seawater and, to this end, it is necessary to find solutions to the following points.

Primarily, the marine rescue equipment is not required to operate in an ordinary situation other than emergency, but it is a very important property for the marine rescue equipment to appropriately operate in a situation in which rescue is required when a person falls into the sea, and thus it is important for the marine rescue equipment to use a battery optimized for such a property.

However, when a conventional lithium ion battery is used, electrical discharge naturally occurs in an ordinary situation other than emergency, and thus, in consideration that the lithium ion battery is usually stored for a long period of time, there is a problem in that the lithium ion battery is almost discharged at a time when an emergency situation requiring marine rescue occurs such that rescue equipment may not operate normally.

Further, even when a conventional zinc-air battery is used as a battery, the zinc-air battery is almost discharged during a storage period like the lithium ion battery due to a case in which the zinc-air battery is exposed to outside air in an ordinary situation, such that the rescue equipment may not operate normally in an emergency situation.

SUMMARY

The present invention is directed to providing a zinc-air battery having an excellent storage property because electrical discharge hardly occurs in an ordinary situation in which external moisture does not flow in and capable of generating electricity only when being exposed to an environment in which water flows into the zinc-air battery from the outside in the case of falling into the sea, thereby being usefully applied to a device or equipment, such as marine rescue equipment, requiring generation of electricity in an environment exposed to water.

One aspect of the present invention provides a zinc-air battery including an air electrode part, a separator, and a negative electrode part which are sequentially included in a case, wherein the negative electrode part includes potassium hydroxide (KOH) in the form of a powder and an opening part is formed in at least a region of the case and is covered with a porous membrane.

The negative electrode part may further include zinc (Zn) in the form of a powder.

The opening part may be formed in at least a portion of a region occupied by the negative electrode part of the case.

The porous membrane may have a pore size that is smaller than a particle size of each of the zinc (Zn) powder and the KOH powder.

The present invention may also include marine rescue equipment incorporating the zinc-air battery according to the present invention.

According to a zinc-air battery of the present invention, there are advantages in that a long-term storage property is very excellent because electrical discharge hardly occurs in an ordinary situation in which external moisture does not flow in, and electricity can be generated only when the zinc-air battery is exposed to an environment in which water flows into the zinc-air battery from the outside in the case of falling into the sea, such that the zinc-air battery can be usefully applied to a device or equipment, such as marine rescue equipment, requiring generation of electricity in an environment exposed to water.

DETAILED DESCRIPTION

Figure 1:
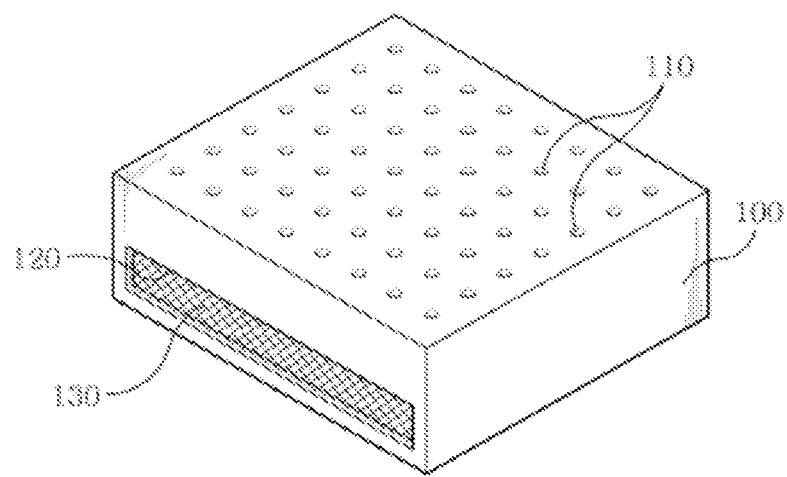
FIG. 1 is a perspective view illustrating an exterior of a zinc-air battery according to one embodiment of the present invention.

The present invention may be modified into various forms and may have a variety of embodiments, and, therefore, specific embodiments will be illustrated in the drawings and described. The embodiments, however, are not to be taken in a sense which limits the present invention to the specific embodiments, and should be construed to include modifications, equivalents, or substitutions within the spirit and technical scope of the present invention. Also, in the following description of the present invention, when a detailed description of a known related art is determined to obscure the gist of the present invention, the detailed description thereof will be omitted.

The terms used herein are employed to describe only specific embodiments and are not intended to limit the present invention. Unless the context clearly dictates otherwise, the singular form includes the plural form. It should be understood that the terms "comprise," "include," and "have" specify the presence of stated herein features, numbers, steps, operations, components, parts, or combinations thereof, but do not preclude the presence or possibility of adding one or more other features, numbers, steps, operations, components, parts, or combinations thereof.

Although the terms "first," "second," and the like may be used herein to describe various components, these components should not be limited by these terms. The terms are used only for the purpose of distinguishing one component from another component.

The present invention relates to a zinc-air battery, and more particularly, to a zinc-air battery including an air electrode part, a separator, and a negative electrode part which are sequentially included in a case, wherein the negative electrode part includes potassium hydroxide (KOH) in the form of a powder, and an opening part is formed in at least a region of the case and is covered with a porous membrane.

In the present invention, the air electrode part corresponds to a positive electrode part of a conventional zinc-air battery, which serves as a positive electrode into which external air flows and includes an air diffusion layer and a catalytic active layer.

In the present invention, the separator is disposed between the air electrode part and the negative electrode part to prevent a short-circuit between the air electrode part and the negative electrode part, and the separator is preferably made of a material, such as polypropylene, having ion permeability.

The zinc-air battery of the present invention preferably includes the negative electrode part including KOH in the form of a powder so as to generate electricity when external water is supplied to the negative electrode part. Since the negative electrode part of the present invention includes KOH in the form of a powder, when external moisture such as seawater or fresh water flows into the negative electrode part, the KOH powder is converted into a KOH electrolyte such that zinc (Zn) existing in the negative electrode part is wet and is activated as a negative electrode active material.

The negative electrode part includes Zn as a metal, and a shape of the Zn is not particularly limited, but the negative electrode part preferably includes a zinc powder in the form of a powder so as to maximize an active surface area as a negative electrode active material.

The case is an exterior material of the zinc-air battery and serves to protect the air electrode part, the separator, and the negative electrode part, which are included in the case, from an external environment. In the present invention, the opening part is formed at the case in at least a portion of a region occupied by the negative electrode part and is covered with the porous membrane. The opening part serves as a path for allowing external moisture such as seawater or fresh water to flow into the negative electrode part, and when the external moisture flows into the negative electrode part through the opening part, the KOH powder existing in the negative electrode part is converted into a KOH electrolyte such that Zn existing in the negative electrode part is wet and is activated as a negative electrode active material.

The opening part is preferably formed in only a region occupied by the negative electrode part of the case so as to minimize an inflow of the moisture into the air electrode part and the separator, and a shape and a size of the opening part and the number thereof are not particularly limited and thus various shapes, various sizes, and the various number thereof may be formed.

However, in order to prevent discharge of the Zn powder and the KOH powder of the negative electrode part inside the case to the outside of the case, the opening part is preferably covered with a porous membrane through which the external water may pass but the Zn powder and the KOH powder of the negative electrode part inside the case may not pass. Therefore, it is preferable that the porous membrane covering the opening part has a pore size that is smaller than a particle size of each of the Zn powder and the KOH powder, and a material of the porous membrane may be any material such as fiber or metal.

The case may have an air hole formed in at least a portion of a region occupied by the air electrode part so as to allow external air to flow into the air electrode part, and a positive terminal and a negative terminal may be formed at the case and may be respectively and electrically connected to the air electrode part and the negative electrode part which are provided inside the case.

Since electrical discharge does not occur in the zinc-air battery according to the present invention because moisture is not supplied in an ordinary situation, and the zinc-air battery is capable of generating electricity when water flows into the negative electrode part at least once through the opening part of the case, the zinc-air battery according to the present invention may be applied to various applications, e.g., marine rescue equipment. More specifically describing an example of applications, in the case of a global positioning system (GPS) device attached to a life vest, when a conventional lithium ion battery or the like is used as a battery for the GPS device, the lithium ion battery may be almost discharged as being stored for a long period of time and thus the GPS device may not operate normally at a time when marine rescue is required, but when the zinc-air battery of the present invention is incorporated into the GPS device, electrical discharge may hardly occur in an ordinary situation in which external moisture does not flow in and, when a person falls into the sea due to a marine accident, the external water may flow into the negative electrode part of the zinc-air battery to generate electricity, such that there is an advantage in that the GPS device operates normally and thus quick rescue is possible through a position tracking for the person falling into the sea.

As another example of applications, in the case that a heating device is attached to a portion of the life vest in contact with a heart of a person, when the zinc-air battery of the present invention is incorporated as a battery of the heating device, electrical discharge may hardly occur in an ordinary situation in which external moisture does not flow in and, when a person falls into the sea due to a marine accident, the external water may flow into the negative electrode part of the zinc-air battery to generate electricity, such that the heating device operates normally to apply heat to the heart of the person falling into the sea and thus there is an advantage in that hypothermia which is one of the biggest problems directly linked to the life of a person involved in a marine accident can be timely suppressed to maximally secure a life-saving time.

A description for helping understanding of the present invention will be made below with reference to the accompanying drawings. The accompanying drawings are merely examples for helping understanding of the present invention, and thus the scope of the present invention is not limited thereto.

FIG. 1 is a perspective view illustrating an exterior of a zinc-air battery according to one embodiment of the present invention. Referring to FIG. 1, a zinc-air battery according to one embodiment of the present invention includes a plurality of air holes 110 formed at an upper surface of a rectangular parallelepiped case 100 and configured to allow air to flow into an air electrode part 210 disposed inside the case 100, an opening part 120 formed at one side surface of the case 100 and configured to allow water to flow into a negative electrode part 230 disposed inside the case 100, and a porous membrane 130 formed at the opening part 120 and configured to prevent a Zn powder and a KOH powder of the negative electrode part 230 disposed inside the case 100 from being discharged to the outside.

Figure 2:
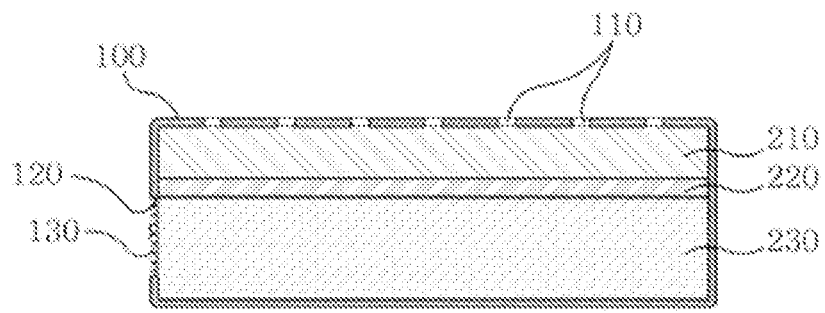
FIG. 2 is a side cross-sectional view of the zinc-air battery shown in FIG. 1 according to one embodiment of the present invention.

An internal structure of the zinc-air battery shown in FIG. 1 will be described below with reference to a side cross-sectional view shown in FIG. 2. Referring to FIG. 2, the zinc-air battery according to the present invention is configured such that the air electrode part 210 is disposed at an upper portion of an interior of the case 100 to communicate with the plurality of air holes 110 formed at the upper surface of the case 100, a separator 220 is disposed immediately below the air electrode part 210, and the negative electrode part 230 is disposed immediately below the separator 220. The negative electrode part 230 includes a Zn powder and a KOH powder in the form of a powder, and thus when external moisture flows in through the opening part 120 formed at the one side surface of the case 100, the Zn powder is mixed with a KOH electrolyte and is activated as a negative electrode active material, such that the zinc-air battery of the present invention may generate electricity.

As described above, those skilled in the art can understand that the present invention may be implemented in other specific forms without departing from the technical spirit or the necessary features of the present disclosure. The scope of the present invention is defined by the appended claims rather than the detailed description, and it should be construed that all alterations or modifications derived from the meaning and scope of the appended claims and the equivalents thereof fall within the scope of the present invention.

The invention claimed is:

1. A zinc-air battery comprising:
    an air electrode part;
    a negative electrode part comprising potassium hydroxide (KOH) in a form of a powder;
    a separator formed between the air electrode part and the negative electrode part; and
    a case enclosing the air electrode part, the negative electrode part and the separator, the case having a plurality of air holes formed in a region occupied by the air electrode part and an opening part formed only in a region occupied by the negative electrode part of the case to minimize an inflow of a moisture into the air electrode part and the separator, the opening part covered with a porous membrane, the porous membrane having a pore size smaller than a particle size of the KOH powder.

2. The zinc-air battery of claim 1, wherein the negative electrode material further includes zinc in a form of a powder.

3. The zinc-air battery of claim 2, wherein the porous membrane has a pore size that is smaller than a particle size of each of the zinc (Zn) powder and the KOH powder.

4. Marine rescue equipment incorporating the zinc-air battery according to claim 1.

5. The zinc-air battery of claim 1, wherein the porous membrane is made of fiber or metal.

* * * * *